Figure 3:
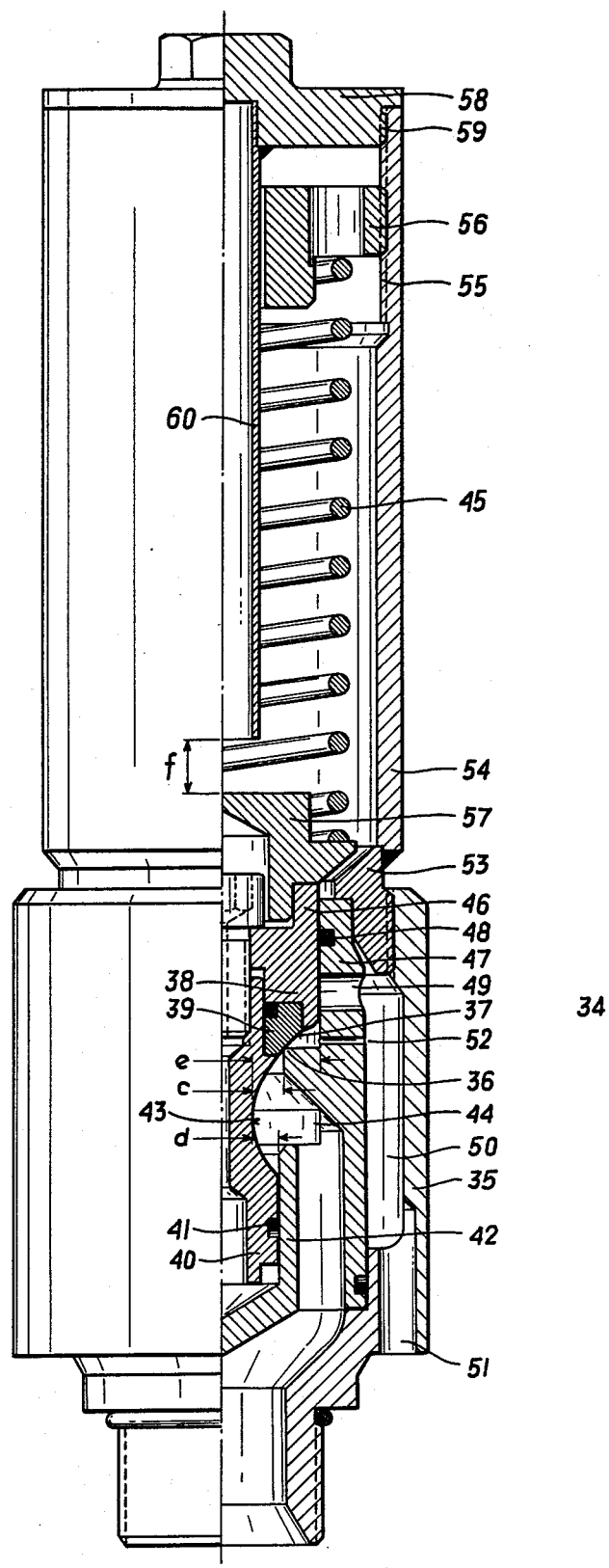

United States Patent [19]

Sigott et al.

[11] 4,111,227
[45] Sep. 5, 1978

[54] PRESSURE RELIEF VALVE FOR HYDRAULIC MINE SUPPORTING ELEMENTS

[75] Inventors: Siegfried Sigott; Heinrich Suessenbeck; Alfred Zitz, all of Zeltweg; Gottfried Siebenhofer, Vienna, all of Austria

[73] Assignee: Vereinigte Osterreichische Eisen- und Stahlwerke - Alpine Montan Aktiengesellschaft, Vienna, Austria

[21] Appl. No.: 719,653

[22] Filed: Sep. 1, 1976

[30] Foreign Application Priority Data

Sep. 9, 1975 [AT] Austria .................................. 6947/75
Feb. 12, 1976 [AT] Austria .................................. 1007/76

[51] Int. Cl.² ........................................... F16K 31/363
[52] U.S. Cl. ..................................... 137/469; 137/494
[58] Field of Search .................. 137/469, 494, 505.18

[56] References Cited

U.S. PATENT DOCUMENTS

| 2,134,803 | 11/1938 | Rose | 137/469 |
| 2,730,269 | 1/1956 | Earle | 137/505.18 X |
| 2,980,132 | 4/1961 | Prijatel | 137/469 |
| 3,277,838 | 10/1966 | Canalizo | 137/155 X |

FOREIGN PATENT DOCUMENTS 1,318,596 1/1963 France ............................. 137/469

*Primary Examiner*—Alan Cohan
*Attorney, Agent, or Firm*—Cushman, Darby & Cushman

[57] ABSTRACT

A pressure relief valve for hydraulic mine supporting elements, particularly mine props, has a valve member loaded in its closing direction by a spring, a piston is connected to the valve member end sealingly sliding within a cylinder of the valve housing and arranged to be acted upon in closing direction by the pressure prevailing within the space before the seat of the valve member. The valve member has a neck portion of reduced diameter between the valve seat and the piston and the annular cross section, being acted upon in closing direction, between the neck portion and the circumference of the piston is smaller than the annular cross section, being acted upon in opening direction, between the neck portion and the valve seat.

11 Claims, 3 Drawing Figures

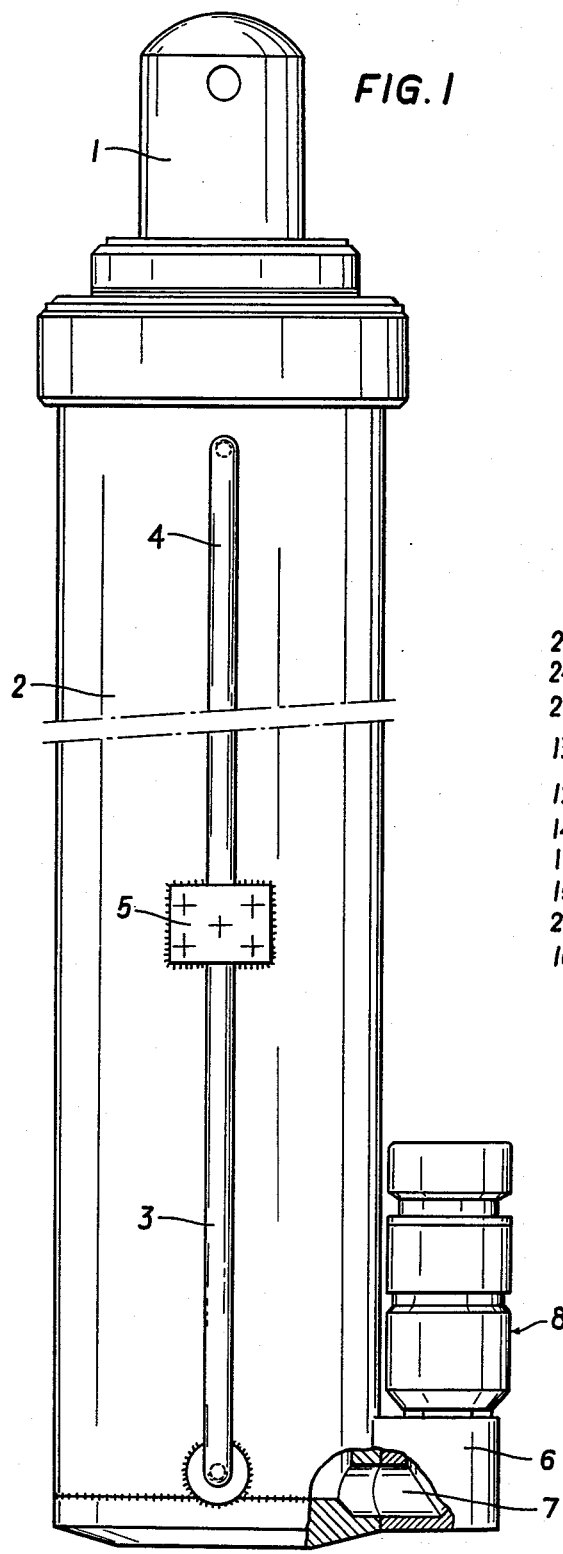
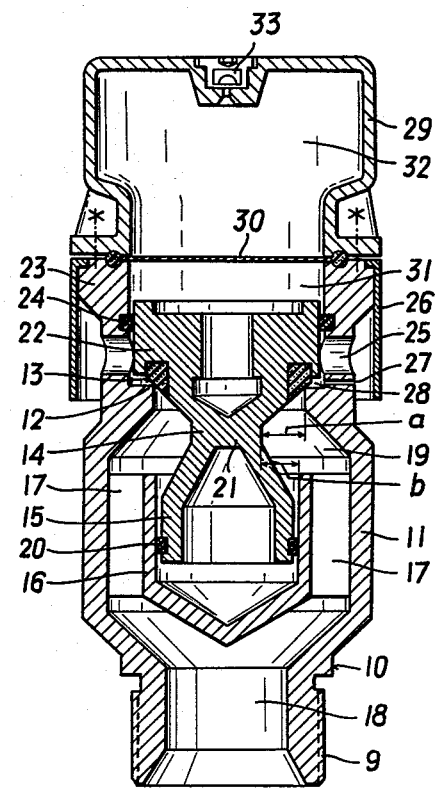

PRESSURE RELIEF VALVE FOR HYDRAULIC MINE SUPPORTING ELEMENTS

The present invention refers to a pressure relief valve for hydraulic mine supporting elements, particularly mine props, having its valve member loaded in closing direction by a spring means. When tensions existing in the rock are suddenly relieved, the mine roof at the working face or in the galleries may suddenly sink down in only fractions of seconds so that the mine supporting elements become very rapidly overloaded. Usual overload pressure valves of mine props serving to adjust the maximum load are not designed to respond with sufficient rapidity to such high velocities of downward movement of the mine roof. Overload valves for mine supporting elements are intended to rapidly yield a rapidly increasing load but such known overload pressure valves do only respond with some time delay, which nevertheless is very short. However, the smallest delay in load relief might result in a destruction of the hydraulic mine roof supporting elements and hydraulic mine props, respectively. If on account of delayed response of an overload pressure valve of a mine supporting element this mine supporting element is only damaged to a small extent, this mine supporting element is no more operable and must be brought from the mine into the workshop for repair and must be exchanged by an other mine supporting element. This alone is a considerable drawback and, in addition, repair costs fall due if the supporting element has not been completely destroyed.

It is an object of the invention to avoid these drawbacks and the invention essentially consists in that to the valve member of the pressure relief valve a piston is connected which is sealingly sliding with a cylinder of the valve housing and which is acted upon in closing direction by the pressure existing within the space before the seat of the valve member, in that the valve member has a neck portion of reduced diameter between the valve seat and the piston and in that the annular cross section, being acted upon in closing direction, between the neck portion and the circumference of the piston is smaller than the annular cross section, being acted upon in opening direction, between the neck portion and the valve seat. Such a construction has the advantage that the valve member can be loaded with a relatively low spring pressure and that, in spite thereof, a very high pressure can be adjusted which effects opening of the valve. Heavy springs for loading the valve member, as a rule a valve cone, become thus superfluous and this provideds a more rapid response of the valve. The low pressure acted on the valve member makes it possible to precisely adjust the valve to open at the desired pressure. Furthermore the valve becomes a great cross section of fluid passage because the neck portion of the valve cone is, on opening of the valve, moved into the area of the valve seat, which is of particular importance on sudden mine roof descent or rock burst.

The valve cone conveniently has, according to the invention, a conical seat member and downstream thereof a slide piston of greater diameter as is the diameter of the valve seat, said slide piston cooperating with exit openings of the valve housing and clearing these openings only after a predetermined valve stroke. When the valve cone is lifted off its seat, the annular cross section subjected to pressure in opening direction will thus be essentially increased and the valve cone will rapidly be moved in completely opened position. The valve can only become closed if the spring acting on the valve cone exerts a force which exceeds the force resulting from the pressure acting on the valve cone in opening direction. In view of the essentially greater annular cross-section, on which the pressure prevailing within the working chamber of the prop is not acting in opened position of the valve cone, the valve can, after a sudden roof descent or rock bust, close only if the pressure within the working chamber of the prop has fallen to a harmless value. As long as this harmless pressure is not attained, the valve is held open by the pressure of the hydraulic fluid acting on the valve cone. The pressure for opening the valve, i.e., that pressure of the hydraulic fluid within the hydraulic mine supporting element and mine supporting prop, respectively, at which the overload shall open, can, for example, be adjusted to 375 bar, while the closing pressure is adjusted to 35 bar for ensuring that the excessive high pressure exerted with beginning mine roof descend or rock burst has already vanished on closure of the valve and for avoiding continous reciprocal movement of the valve member between the opened position and the closed position. This is made possible in view of a substantially greater surface area of the valve member being, with the valve member lifted off its seat, subjected to the pressure of the hydraulic medium within the hydraulic mine supporting element or prop than in closed position of the valve member, i.e., with the valve member pressed to its seat. In a hydraulic mine prop, an overload valve is provided for connecting the pressure chamber of the mine prop with its overflow chamber and for reducing the height of the mine prop when the pressure within the pressure chamber exceeds a predetermined pressure. This overload valve is responding, for example, at a pressure of 325 bar. The cross section of fluid passage of this overload valve is, however, far too small to allow the mine prop to rapidly reduce its height on a occurring rock burst or mine roof descent. Thus the pressure relief valve according to the invention which allows such rapid height reduction, is opening only if the nominal operating pressure of said overload valve is exceeded.

It is convenient to provide the valve housing with relief openings which open, on the one hand, into that space which is closed position of the valve member is kept free between the valve seat and the slide piston and, on the other hand, into the atmosphere. In this manner, oscillating movement of the valve member during the opening movement can be avoided, which oscillating movement might in view of the high pressures damage the seat by a hammering action.

The arrangement is preferably such that a closed chamber for containing a gas cushion acting on the valvwe member in closing directon i provided for acting as the spring means, noting that a filling valve is connected to said closed chamber. By having a gas cushion, which is practically mass-free, acting as the spring means, mass forces as are unavoidable with springs can be avoided and the speed of response of the pressure relief valve is increased. The filling valve does not only allow to introduce gas into the gas chamber for compensating any gas losses but also allows to adjust the gas pressure within the gas chamber to the desired valve such that the pressure of the hydraulic fluid contained within the hydraulic mine supporting element can be arbitrarily selected and be adjusted to a value at which the pressure relief valve is responding. Such a gas cushion allows precise adjustment of said selected pressure.

According to a preferred embodiment of the invention, the valve member is equipped with a piston-like part being sealingly guided within a cylinder which is filled with a liquid, particularly oil of hydraulic quality, and in which this piston-like part is introduced on opening movement of the valve member, noting that the liquid-filled cylinder is closed relative to the gas chamber containing the gas suhion by means of a gas-tight diaphragm. Such a diaphragm has a neglectible low mass which is of advantage in view of the high desired speed of response to the valve. Further, in view of said diaphragm being subjected, on the one hand, by the pressure of the liquid and, on the other hand, by a gas pressure, the pressure is uniformely acting on the whole diphragm surface so that this diaphragm is spared and kept operable. Filling said cylinder with a liquid provides the advantage that a thight seal between piston and cylinder can more easily be achieved than would be the case if the gas cushion would immediately act on the piston.

According to the invention, the gas chamber for the gas cushion is formed of a container being open at one of its ends, said open end being connected, particularly flanged to the cylinder with interposition of the diaphragm. The diaphragm conveniently consists of synthetic plastics material, for example polyvinyl chloride, noting that this diaphragm simultaneously represents the sealing element between the cylinder and the container accomodating the gas cushion.

However, the arrangement can also be such, that the valve member is provided with a piston-like part being sealingly guided within a cylinder, which is arranged approximately vertically and in which the piston-like part is introduced from below in upward direction on opening movement of the valve member and which forms the chamber accomodating the gas cushion or is in connection with this chamber, noting that said cylinder is partially filled with a liquid, particularly oil of hydraulic quality. In view of the piston being introduced into the cylinder from below, the heavy liquid and hydraulic oil, respectively, is accumulated at the sealing area between the cylinder and the piston in operating position of the mine supporting element or the mine supporting prop so that the required seal can more easily be effected. Further, in view of the liquid is only partially filling the chamber, there is sufficient space for the gas cushion acting as a spring means. This embodiment allows to do without diaphragm.

In view of the spring means being required to only act against relatively low pressures, the spring means used can even be a relatively weak coil spring. With such an arrangement the tension of the coil spring acting on the valve member is preferably adjustable, which can be achieved in a simple manner be connecting to the valve housing a bushing surrounding the spring, a spring washer being adjustably screwed into said bushing at the side opposed to the valve member. Such a construction is without further permissible in consideration of the fact that such a valve construction allows to make use of a relatively weak closing spring. The bushing surrounding the spring may be closed by a cover which is carrying an abutment for limiting the stroke of the valve member, as a rule a valve cone.

The invention is further illustrated with reference to the drawing showing embodiments of a pressure relief valve according to the invention.

In the drawing

FIG. 1 represents a mine supporting prop with the pressure relief valve mounted, FIG. 2 represents a longitudinal section of the pressure relief valve in an enlarged scale and FIG. 3 represents an axial section through a modified embodiment of a pressure relief valve according to the invention.

In FIG. 1 1 is the inner prop part and 2 is the outer prop part of a hydraulic mine supporting prop. The inner prop part is as usual slidingly guided within the outer prop part and is filled with oil. The mine supporting prop is erected such that oil is pressed into the lower part of the outer prop part 2 and below the inner prop part 1. The lower chamber of the outer prop part 2 is connected with its upper chamber via a conduit 3, 4. A overload pressure valve 5 is interpositioned between the conduit sections 3 and 4. This overload pressure valve 5 opens on overload and allows the oil to flow into the upper part of the outer prop part 2. This overload pressure valve has a far too reduced cross section of fluid passage for enabling the mine supporting prop to sufficiently reduce its height on a occuring mine roof descent or rock burst and only serves to account for a gradually increasing roof pressure. A pocket 6 is connected to the lower part of the outer prop part 2 via a bore 7 having a great cross section of fluid passage. The pressure relief valve 8 is screwed into this pocket 6 by means of a screw thread 9 as shown in FIG. 2. 10 is a hexagonal part for enabling the application of a tool.

The valve housing 11 has a valve seat on which rests the valve member 14 with its conical seat member 13. This conical seat member is formed of a ring of sealing material, i.e., of bronze, which is inserted into an annular groove. The valve member 14 has at its lower end a piston 15 which is guided within a cylinder 16 being integral with the valve housing 11. 17 are several bores which are arranged around the cylinder 16 and are connecting the connection piece 18 with the space 19 before the valve seat 12. 20 is a sealing ring inserted into an annular groove within the piston 15.

In closed condition of the valve, the pressure of the oil contained within the outer prop part 2 and below the inner prop part 1 is acting within the space 19. This pressure is acting in upward direction on an annular area $a$, the inner diameter of which is equal to the diameter of the neck portion 21 and the outer diameter of which is equal to the diameter of the valve seat, and in downward direction on an annular area $b$ the outer diameter of which is equal to the inner diameter of the cylinder 16 and the inner diameter of which is again equal to the diameter of the neck portion 21 of the valve member 14. In view of the inner diameter of the valve seat 12 being greater than the inner diameter of the cylinder 16, the influence of the annular area $a$ is the greater influence so that the pressure is acting in a direction to upwardly lift the valve member 14.

The upper portion of the valve body 14 is designed as a piston 22 which is guided within the cylinder 23. 24 is a sealing ring inserted into a groove within the wall of cylinder 23. 25 are exit openings which open into the atmosphere. As soon as the valve member is lifted off its seat 12, the outer diameter of the annular area $a$ is increased to the outer diameter of the piston 22. Thus, the pressure acting within the space 19 is also acting on this greater annular area and, as a consequence, the valve member 22 is rapidly moved in upward direction to completely clear the exit openings 25.

26 is a shield which deflects the emerging oil in downward direction for the purpose of avoiding too great a fouling of the environments. One or several bores 27 of small diameter are provided for allowing oil to flow out of the space 28 located between the valve seat 12 and the piston 22 as soon as the valve member 14 has just been lifted for a small distance off its valve seat 12. This prevents oscillations of the valve member.

29 is a container consisting of steel casting and being flanged to the cylinder 23 with interposition of a diaphragm 30. This diaphragm 30 consists of synthetic plastics material, for example of polyvinyl chloride, and provides of a seal between the cylinder 23 and the container 29.

The interior space 31 of the cylinder 23 is filled with oil and a gas cushion is provided within the space 32 enclosed by the container 29 and above the diaphragm 30, said gas cushion being for example provided by nitrogen or air. This gas cushion provides the spring means for preloading the valve member 14, noting that the pressure of said gas cushion is transmitted on the valve member 14 via the oil contained within the space 31 and with interposition of the diaphragm 30.

The pressure at which the valve is opened is defined by the pressure of the gas cushion within the space 32. 33 is a valve which serves for pressing gas into the space 32 and by means of which the pressure within the space 32 can be adjusted to the opening pressure generated within the space 19.

FIG. 3 shows a pressure relief valve equipped with a coil spring. This pressure relief valve 34 comprises a valve housing 35 within which a valve seat 36 is provided. On this valve seat 36 the conical seat member 37 of the valve cone 38 is resting, noting that the conical seat member 37 is formed of a ring 39 of sealing material and is interchangeably inserted into an annular groove of the valve member. The lower end of the valve cone has a piston 40 which is provided with a sealing 41 and which is sliding within the cylinder 42 of the valve housing 35. The valve member has a neck portion 43 between the conical seat member 37 and the piston 40. Thus, the pressure prevailing within the space 44 before the valve seat 36 is acting, in opening direction of the valve, on an annular area having the radial width $c$ and is acting, in closing direction of the valve, on an annular area having the radial width $d$. In view of the annular area of the radial width $c$ being greater than the annular area having the radial width $d$, the resulting force is acting in opening direction of the valve, but on normal condition made ineffective by a counteracting coil spring 45.

As soon as the pressure difference acting in opening direction of the valve exceeds the closing pressure provided by the spring 45, the valve cone 38 is lifted off its seat 36. A slide piston 46 forms a continuation of the conical seat member 37 and is guided within the cylinder 47, noting that again a sealing ring 48 is provided. This cylinder 47 forms the slide main face having outlet openings 49 being controlled by the slide piston 46. As soon as the conical seat member 37 has been lifted off its seat 36, the radial width of the annular area being acted upon by the opening pressure is increased to the value $e$. In view of the preponderance of the opening pressure, the piston 46 is, together with the valve cone 38, rapidly moved into opened position, so that the pressurized fluid may flow out over the openings 49, being arranged around the circumference, and over exit conduits 50 having their mouthes 51 downwardly directed.

With the valve opened, the pressure prevailing within the space before the valve seat is acting in opening direction on the annular area having the radial width $e$ and in closing direction on the annular area having the radial width $d$. The differential area on which the pressure is acting in upward direction with the valve opened is thus essentially greater than the differential area on which the pressure has acted in upward direction with the valve closed. With the valve closed, the pressure has only acted in upward direction on that annular area which results by subtracting the annular area having the radial width $d$ from the annular area having the annular width $c$. The valve becomes thus only opened at that very high pressure which is acting in case of a rock burst. Closing movement of the valve under the action of the spring 45 is, however, only initated if the pressure has fallen below an essentially lower value because the spring 45 must overcome the pressure acting on that annular area which results by subtracting the annular area having the radial width $d$ from the annular area having the radial width $e$. Closing movement of the valve is thus reliably only initated when the pressure within the working chamber of the inner prop part 1 has become sufficiently reduced.

52 is a relief bore which prevents the valve member 38 from becoming suddenly lifted and from exerting oscillations.

A bushing 54 is welded to a ring 53 screwed into the valve housing 35. Said bushing 54 has an internal thread 55 for screwedly accomodating in an adjustable manner the upper spring washer 56 for the coil spring 45, so that the tension of the spring 45 can be adjusted. 57 is the lower spring washer which is only loosely positioned on the ring 53. 58 is a cover for closing the upper end of the bushing 54. This cover 58 is screwed into said bushing 54 by means of a thread 59. A tube 60 is welded to this cover 58 for limiting the valve stroke to the value $f$.

What we claim is:

1. A pressure relief valve for hydraulic mine supporting elements, particularly mine props, comprising a valve housing having exit openings; a valve member having a valve seat; said valve member being loaded in closing direction by a spring means; a first piston connected to the valve member, said first piston being sealingly slidable within a first cylinder in the valve housing and being acted upon in closing direction by the pressure prevailing within a space upstream of said valve seat of the valve member, the valve member having a neck portion of reduced diameter between the valve seat and the piston, the annular cross section, being acted upon in closing direction, between the neck portion and the circumference of the piston being smaller than the annular cross section, being acted upon in opening direction, between the neck portion and the valve seat; and a second piston downstream of said valve seat and connected to said valve member, said second piston being of greater diameter than said valve seat and cooperating with said exit openings to clear these openings only after a predetermined valve stroke in the opening direction, said second piston defining with said valve housing a space which in the closed position of said valve member exists between said valve seat and said exit openings, said valve housing having at least one bore which places said space in communication with the atmosphere thereby preventing oscillations of the valve member.

2. A pressure relief valve as in claim 1, wherein the valve seat is conical.

3. A pressure relief valve as in claim 2 wherein a ring of sealing material is inserted into the valve cone at the area of the conical seat surface.

4. A pressure relief valve as in claim 1 including means defining a space closed on all sides for accommodating a gas cushion acting on the valve member in closing direction and forming said spring means, and further including a filling valve connected to said closed space.

5. A pressure relief valve as in claim 4 wherein said second piston is sealingly guided within a liquid-filled second cylinder in the valve housing and into which said second piston is immersed on opening movement of the valve member, said liquid-filled cylinder being closed relative to said closed space containing the gas cushion by means of a gastight flexible diaphragm.

6. A pressure relief valve as in claim 4 wherein the space accommodating the gas cushion is formed by a container which is open at one of its ends, said open end being connected to said valve housing with a flexible diaphragm disposed between said open end and said second cylinder.

7. A pressure relief valve as in claim 5 wherein said diaphragm is formed of synthetic plastics material.

8. A pressure relief valve as in claim 1 wherein said spring means includes a coil spring the tension of which is adjustable.

9. A pressure relief valve as in claim 8 wherein a bushing surrounding the coil spring is connected to the valve housing, a spring washer being adjustably screwed into said bushing at the side opposed to the valve member.

10. A pressure relief valve as in claim 9 wherein the bushing surrounding said spring is closed by means of a cover carrying an abutment for limiting the stroke of the valve member.

11. A pressure relief valve as in claim 1 wherein said exit openings are downwardly directed.

* * * * *